2,797,998
DEVELOPMENT OF CURED COLOR FOR MEAT PRODUCTS

Robert J. Praizler, Chicago, Ill., assignor to Swift & Company, Chicago, Ill., a corporation of Illinois No Drawing. Application June 17, 1950,
Serial No. 168,865

5 Claims. (Cl. 99—159)

This invention relates to an improved method of producing a cured meat product and more particularly to the production of frankfurters, bologna, and similar cured sausage.

In the commercial production of cured meat products and particularly sausage products such as frankfurters, vienna sausage, bologna, and similar products frequently referred to as domestic sausage, the meat emulsion containing the necessary proportion of meat, meat products, spices, and curing salts are stuffed into casings and placed in a smokehouse for a period of generally between 2½ and 4 hours when processing frankfurters, for example, in order to develop the proper cured appearance therein. It is a practice to allow the meat emulsion to stand overnight so that the period required to develop the proper cured appearance will be shortened. According to the best present-day procedure, however, it is necessary to hold the sausage in the smokehouse for at least 2¼ hours if the sausage is made of fresh meat and processed without prolonged holding in order to obtain the desired uniform pink cured appearance. Also, it is frequently observed that certain meat emulsions when subjected to the standard curing procedure do not "cure out" at the end of the normal curing period, possibly due to the low bacterial content and enzymatic activity of the emulsion. Often this can be corrected by prolonging the smoking time considerably. This is uneconomical, however, and interferes with production schedules.

It is therefore an object of this invention to provide a method of producing an improved cured meat product in a more economical manner.

It is a further object of this invention to provide a method of producing an improved cured meat product which requires a substantially shorter curing period.

It is still another object of the present invention to provide a method of producing an improved cured meat product having a more uniform, attractive cured appearance.

It is an additional object of the invention to provide an improved method of producing a frankfurter which is "cured out" in a relatively short period without regard to the bacterial condition of the frankfurter emulsion.

Still another object of the invention is to provide a method of producing a frankfurter having the characteristic cured appearance and flavor without the customary large shrinking losses during the curing thereof.

Other objects of this invention will be apparent from the detailed description and claims to follow.

According to the present invention it has been discovered that by incorporating a small amount of ascorbic acid, dihydroxy maleic acid, or edible salts thereof in a meat product containing a nitrite curing salt, the length of time the meat product must be held to develop the necessary cured appearance is substantially reduced without impairing the cooking or eating properties of the meat product. In many instances the curing time may be reduced to about half the time previously required for curing the same product. Moreover, the use of ascorbic acid, for example, insures the development the desired cured appearance after holding the product for a predetermined time substantially shorter than normally required. Also, when a skinless frankfurter is desired, it has been observed that the frankfurter containing ascorbic acid, dihydroxy maleic acid, or salts thereof may be skinned more readily, leaving a skinless product having a more desirable cured appearance, both on the surface and within the body of the frankfurter.

In applying the present invention to the production of sausage, all the ascorbic acid, ascorbate, or dihydroxy maleic acid is added to the meat, moisture, spices, and curing materials during the chopping operation when preparing the meat emulsion. The emulsion which may or may not be vacuumized is immediately stuffed into casings, either natural or artificial, and promptly processed through the smoking and cooking operations. The duration of the smoking operation is determined by the time required to develop the desired cured appearance and the intensity of the smoking flavor desired. With frankfurters, for example, a substantial proportion of the production need not be smoked to any great extent, and the time that such a product must be held in a "smokehouse" is dependent largely upon the time required to develop the desired cured appearance in the meat. After smoking, the frankfurters are cooked in water to an internal temperature of at least 137° F. to render the product safe for eating without further cooking.

It has been found that ascorbic acid, for example, when added in amounts as low as 0.0019 percent based on the weight of the raw meat ingredients causes the meat to cure out appreciably more rapidly than the product containing no ascorbic acid or edible salt thereof. When the ascorbic acid or salt thereof is used in amounts of 0.0005 percent based on weight of the raw meat ingredients, however, a sausage made therewith fails to show any significant improvement in the rate of curing of the product. When 0.1 percent dihydroxy maleic acid, ascorbic acid, or edible salts thereof are used, no objectionable flavor is imparted to the meat product. Since between 0.015 percent and 0.03 percent ascorbic acid or salt thereof based on the weight of the raw meat ingredients produces a highly satisfactory product within a substantially shorter processing time, it has been found unnecessary to employ higher concentrations of the ascorbic acid or salt thereof, although 1 percent or more could be used without impairing the flavor of the cured product.

It has been observed that the rate of development of the desired cured color within a meat product varies with the concentration of the herein disclosed curing accelerators, such as ascorbic acid or salt thereof used. Thus, for example, with 0.015 percent ascorbic acid incorporated in a frankfurter emulsion, the frankfurters may be cured and smoked to the customary degree in from 1 to 1¼ hours. Frankfurters made with 0.03 percent ascorbic acid are cured out after 40 minutes in a smokehouse maintained at 170° F. as compared with a smoking time of 80 minutes required by the conventional frankfurter emulsion. As it generally has been found desirable to allow frankfurters to remain in the smokehouse for one hour before cooking, a concentration of about 0.025 percent ascorbic acid or acid salt is considered preferable.

The activity of the ascorbic acid or salt thereof is also affected by the amount of air incorporated in the meat product. For example, during the chopping of the ingredients of a frankfurter emulsion it has been found that a given concentration of ascorbic acid is more effective when, for example, the Hottman type silent meat chopper is operated at its rated capacity than when the chopper is operated substantially below its rated capacity. Likewise, if the prepared emulsion is subjected to a vacuum before stuffing into casings, the emulsion so treated develops the desired cured color much more rapidly. When the meat emulsion is subjected to a vacuum prior to stuffing and smoking, it is generally sufficient to employ about 0.01 percent ascorbic acid or its equivalent weight of ascorbic acid salt, based on the weight of the raw meat ingredients. When a meat emulsion is not vacuumized, however, a concentration of about 0.02 percent ascorbic acid or an equivalent weight of a salt thereof is required in order to obtain the maximum benefits in curing the meat product.

Table I illustrates the variation in curing time with the percentage of ascorbic acid or acid salt used in a frankfurter emulsion and the effect of vacuumizing the meat emulsion.

TABLE I

| Lot No. | Percent Ascorbic Acid Used | Time from end of chopping to Smoke, hrs./min. | Internal Temp. of Franks into Smokehouse,°F. | Smokehouse Temp., °F. | Time (min.) when internally cured | Color Ratio |
|---|---|---|---|---|---|---|
| 1 | None | 3/20 | 70 | 170 | 80 | 2.62 |
| 2 | 0.0075 | 2/45 | 68 | 170 | 55 | 2.53 |
| 3 | 0.015 | 2/20 | 67 | 170 | 45 | 2.58 |
| 4 | 0.03 | 1/55 | 66 | 170 | 40 | 2.67 |
| 5 | 0.06 | 1/25 | 65 | 170 | 35 | 2.66 |
| 6 | None | 2/45 | 68 | 190 | 60 | 2.50 |
| 7 | 0.0038 | 2/15 | 68 | 190 | 45 | 2.47 |
| 8 | 0.0075 | 1/55 | 66 | 190 | 45 | 2.50 |
| 9 | 0.015 | 1/30 | 64 | 190 | 40 | 2.51 |
| 10 | 0.03 | 1/10 | 65 | 190 | 35 | 2.54 |
| 11 | None | 3/45 | 71 | 215 | 75 | 2.34 |
| 12 | 0.0019 | 3/20 | 70 | 215 | 60 | 2.44 |
| 13 | 0.0038 | 2/55 | 70 | 215 | 50 | 2.53 |
| 14 | 0.0075 | 2/35 | 68 | 215 | 45 | 2.56 |
| 15 | 0.015 | 2/10 | 68 | 215 | 40 | 2.55 |
| 16 | None | 2/30 | 68 | 180 | 55 | 2.78 |
| 17 | 0.0005 | 2/05 | 69 | 180 | 55 | 2.53 |
| 18 | 0.0075 | 1/40 | 66 | 180 | 40 | 2.78 |
| 19 | ¹ 0.0075 | 1/40 | 68 | 180 | 60 | 2.54 |
| 20 | ² 0.0075 | 1/15 | 66 | 180 | 35 | 2.74 |
| 21 | ¹ 0.015 | 0/40 | 65 | 175 | 60 | 2.32 |

¹ Not vacuumized.
² Made with 1/8 oz. NaNO₂ per 100 lbs. meat and without NaNO₃.

It is evident from the foregoing data in Table I that the curing time decreases as the percentage of ascorbic acid or edible salt thereof increases. It is also evident from the data that a shorter curing time is required when the meat emulsion has been subjected to a vacuum prior to stuffing, since all lots except 19 and 21 were vacuumized before stuffing.

In the foregoing Table I the color ratio referred to is an empirical control which accurately determines the intensity of the cured color in the processed frankfurter. The color ratio is the ratio of the intensity of reflected light at 650 millimicrons over the intensity of reflected light at 570 millimicrons and is determined by measuring the intensity of the light reflected from the interior surface of a cured frankfurter at wavelengths of 570 and 650 millimicrons. The larger the color ratio, the more intense is the cured appearance with a color ratio of 2.3 indicating a satisfactory cure for frankfurters.

The preferred application of the present invention is in the production of frankfurters. In producing frankfurters, the following high-grade frankfurter formula was used, although any standard frankfurter formulation may be employed:

60 lbs. beef trimmings
40 lbs. pork trimmings
3 lbs. salt
1 lb. sugar
5 ozs. pepper
2 ozs. nutmeg
1 oz. garlic
½ oz. sodium nitrate
¼ oz. sodium nitrite The beef trimmings after being ground through a meat grinder are placed in a chopper and 15 pounds of chopped ice and water are added. They are left in the chopper until a smooth emulsion is obtained, after which the pork trimmings and 15 pounds more chopped ice and water are added until the pork is smoothly blended in the emulsion. The spices, salt, sugar, curing materials, and ascorbic acid, dihydroxy maleic acid, or edible salts thereof, are added immediately after the beef and ice have been placed in the silent chopper. The extreme friction taking place during the process of cutting tends to produce heat. Unless the ice and water are added regularly, the meat will become warm, and in a short time it would sour. The ice and water tend to keep the meat at about the same temperature as when placed in the chopping machine. After the meat has been cut to the desired fineness, it is taken out of the chopper, vacuumized if desired, and transferred by trucks to stuffing machines from which it is stuffed into natural or artificial casings. The frankfurter is "linked" to give the desired length and form. The linked frankfurters are placed in a conventional smokehouse at a temperature ranging between 120° and 175° F. Immediately after smoking, the frankfurter is cooked 10 to 12 minutes at a temperature of about 170° F. or to an internal temperature of about 160° F. Immediately after taking the frankfurter out of the cooking vat, it is placed under a cold water spray, which is necessary in order to prevent the frankfurter from becoming wrinkled and to reduce the internal temperature of the frankfurter. The frankfurter is then placed in a cooler and held until packaged.

The following specific examples are merely illustrative of the present invention and should not be construed to limit the invention to the precise conditions and ingredients disclosed therein:

*Example I*

105 pounds of the above-mentioned frankfurter formula containing 0.030 percent sodium ascorbate based on the weight of the raw meat ingredients were made into an emulsion in accordance with the foregoing general procedure. Chopping was terminated when the temperature of the emulsion reached 62° F. and the resulting emulsion stuffed into artificial casings. The chopped emulsion was vacuumized for five minutes at a pressure of 26 inches of Hg (mercury). Frankfurters made from the foregoing emulsion were placed in a smokehouse having a temperature of 170° F. At the end of 40 minutes the frankfurters exhibited a good cured meat color. These frankfurters had a shrinking loss of 8.1 percent. The control lot containing the same frankfurter ingredients but having no ascorbate added thereto required 80 minutes in the smokehouse before exhibiting the same cured appearance, and had a shrinking loss of 12.8 percent.

*Example II*

An identical lot of frankfurter emulsion as that employed in Example I was prepared but no vacuum was employed. The characteristic cured color and flavor developed in the frankfurter at the end of 60 minutes in the smokehouse having a temperature of 175° F. and exhibited a shrinking loss of 8.7 percent as compared with a shrinking loss of 12.8 percent for the control lot.

*Example III*

105 pounds of basic frankfurter formula used in Example I and to which was added 0.015 percent ascorbic acid based on the weight of the raw meat ingredients of the formula were made into an emulsion in accordance with the procedure disclosed herein. Chopping was terminated when the emulsion reached 62° F. and the resulting emulsion stuffed into sheep casings. The frankfurters made from the foregoing emulsion were placed in a smokehouse having a temperature of about 170° F. and were fully cured after 1 hour and 50 minutes in said smokehouse and had an internal temperature of about 137° F. The frankfurters exhibited a shrink of 9.8 percent. The control lot containing the same ingredients but having no ascorbic acid incorporated therein required 3 hours and 10 minutes in the same smokehouse before exhibiting the same cured appearance and had a shrinking loss of 14.6 percent.

*Example IV*

105 pounds of the basic frankfurter formula used in Example I to which was added 0.1 percent dihydroxy maleic acid based on the weight of the raw meat ingredients of the formula were made into an emulsion in accordance with the procedure disclosed herein. The chopping was terminated when the emulsion reached a temperature of 62° F. and the emulsion was then vacuumized at a pressure of 27 inches of mercury. The frankfurters were then stuffed into natural casings and placed in a smokehouse having a temperature of 145° F. At the end of 50 minutes in the foregoing smokehouse, the test lot was fully cured. The control lot of frankfurters containing the same ingredients but having no dihydroxy maleic acid therein required 125 minutes in the same smokehouse to produce the same cured appearance.

By way of further illustrating the invention, Table II which follows set forth the results of a series of test lots of non-colored, skinless frankfurters made in accordance with the foregoing procedure without employing a vacuum on the frankfurter emulsion. As a relatively highly smoked frankfurter was desired, the formulation and processing conditions were set up so that the most rapidly cured frankfurters would remain in the smokehouse a minimum of two hours, although the product was generally fully cured in a much shorter time as the data indicate.

to substantially increase the rate of production with given plant facilities.

Another beneficial result of the present invention which is closely associated with the shortened curing period and which is clearly apparent from the data in Table II is the substantial reduction in the shrinking losses for lots containing ascorbic acid and sodium ascorbate. The percentage shrink was determined for each lot by weighing the stuffed frankfurters before smoking and again weighing the frankfurters about 3 hours after cooking and chilling. In every instance the percentage shrinking losses of the products containing ascorbic acid or sodium ascorbate were substantially less than those of the control lots and generally were at least about 4 percent less than the loss of the control lots. The average shrinking losses of all production lots of frankfurters made with ascorbic acid and smoked 2 hours were 7.8 percent as compared with an average shrinking loss of 12.1 percent for franks processed in the conventional manner. The concentration of 0.015 and 0.030 percent sodium ascorbate is seen to give substantially the same beneficial results as the same concentrations of ascorbic acid.

The decreased shrinking losses which are made possible by the use of the present invention are directly responsible for other substantial savings in the production of frankfurters. Thus, for example, whereas it is now necessary to stuff approximately 113 pounds of raw frankfurter emulsion to produce approximately 100 pounds of finished frankfurters, the use of ascorbic acid or sodium ascorbate makes it possible to produce 100 pounds of finished product from only about 108 pounds of raw emulsion. The additional savings which accrue from the foregoing are the reduction in the amount of casings required to produce a finished product, particularly frankfurters which employ the relatively expensive sheep casings, and

TABLE II

| Test Lot No. | Percent Ascorbic Acid | Percent Sodium Ascorbate | Total Time (Hrs./min.) in Smokehouse when Cured | Total Time (Hrs./min.) in Smokehouse | Internal Temperature (° F.) out of Chopper | Internal Temperature (° F.) into Smokehouse | Internal Temperature (° F.) When Cured | Internal Temperature (° F.) out of Smokehouse | Internal Temperature (° F.) out of Cooktank | Percent Shrinking Loss |
|---|---|---|---|---|---|---|---|---|---|---|
| 1 | .015 | | 1/45 | 2/— | 60 | 63 | 138 | 152 | 162 | 8.2 |
| 2 | / | | 3/25 | 3/55 | 58 | 66 | 150 | 158 | 161 | 9.9 |
| 3 | | .015 | 2/05 | 2/15 | 62 | 63 | 138 | 148 | 162 | 9.1 |
| 4 | .008 | | 1/50 | 2/— | 62 | 64 | 132 | 145 | 162 | 8.4 |
| 5 | / | / | 3/10 | 3/30 | 62 | 67 | 147 | 155 | 161 | 12.4 |
| 6 | .0075 | | 2/— | 2/20 | 58 | 62 | 142 | 152 | 162 | 8.7 |
| 7 | / | / | 3/10 | 3/35 | 59 | 63 | 152 | 157 | 161 | 12.3 |
| 8 | | .015 | 2/05 | 2/20 | 62 | 65 | 134 | 151 | 162 | 8.1 |
| 9 | / | / | 3/10 | 3/25 | 62 | 67 | 147 | 155 | 162 | 15.5 |
| 10 | | .015 | 2/— | 2/20 | 62 | 63 | 135 | 152 | 162 | 3.8 |
| 11 | / | / | 2/50 | 3/15 | 62 | 66 | 148 | 157 | 162 | 14.6 |
| 12 | .011 | | 1/55 | 2/10 | 62 | 63 | 137 | 152 | 162 | 7.9 |
| 13 | / | / | 3/05 | 3/15 | 62 | 64 | 152 | 158 | 162 | 10.9 |
| 14 | | .011 | 1/50 | 2/10 | 62 | 64 | 142 | 150 | 162 | 7.9 |
| 15 | / | / | 3/— | 3/30 | 61 | 64 | 150 | 152 | 162 | 11.1 |
| 16 | / | / | 2/55 | 3/30 | 62 | 65 | 150 | 154 | 162 | 12.5 |
| 17 | .011 | | 1/55 | 2/10 | 62 | 63 | 139 | 154 | 162 | 6.9 |
| 18 | | .011 | 2/— | 2/15 | 62 | 65 | 140 | 153 | 162 | 7.4 |

From the foregoing data it will be apparent that the time the product remains in the smokehouse until it is fully cured is substantially shorter for those frankfurters having ascorbic acid or ascorbic acid salt therein. Thus, for example, lot No. 1 containing 0.015 percent ascorbic acid based on the weight of the raw meat ingredients in the emulsion was cured in 1 hour and 45 minutes, whereas the control batch (lot No. 2) processed on the same day and containing the same ingredients required 3 hours and 55 minutes. Likewise, lot No. 3 containing 0.015 percent sodium ascorbate was cured in 2 hours and 5 minutes, whereas the control batch (lot No. 5) processed on the same day and containing the same frankfurter ingredients required 3 hours and 10 minutes to develop the equivalent cure. It is apparent from the foregoing data in Table II that the present invention substantially reduces the time required for producing a cured frankfurter and thereby greatly reduces the operating costs and makes it possible the reductions in the labor required per 100 pounds of finished product, as well as the savings incidental to the reduction in the heating and smoking time.

It will be evident from the foregoing specific examples and data that the present invention employs as the preferred accelerator for the development of the cured appearance in meat products which are to be cured, a hydroxy carboxylic composition such as the polyhydroxylated unsaturated carboxylic acids and edible salts thereof, the said hydroxy unsaturated carboxylic acid compositions having at least one hydroxy group on an unsaturated carbon atom. Each of the members of the foregoing group of compositions, which may be wholly or partially neutralized, exists in keto-enol tautomeric equilibrium, is a particularly ready source of hydrogen ions, does not produce an off-color in the cured meat product, and is therefore particularly useful in the present invention. It should thus be understood that it is within the broad scope of the present invention to employ edible members of the foregoing classes of compositions which may be dispersed in an aqueous emulsion and include, in addition to dihydroxy maleic acid, ascorbic acid, and edible salts and esters thereof such as ascorbyl palmitate, such compositions as the five-atom lactone ring compositions containing the enediolic system, which are related to ascorbic acid, such as desoxy-ascorbic acid, arabo-ascorbic acid, rhamno-ascorbic acid, fuco-ascorbic acid, gluco-ascorbic acid, glucohepho-ascorbic acid, and the like.

While the specific embodiment of the herein-disclosed invention is related primarily to the production of frankfurters, it should be understood that the present invention may be employed in the production of other cured sausage products and cured meat products. The present invention is particularly valuable wherever it has heretofore been necessary to hold a meat item at elevated temperatures in a smokehouse or heated chamber, or the like until the characteristic cured appearance develops within the product. Various cured meat products which may be produced in accordance with the present invention are frankfurters, vienna sausage, bologna, cured meat loaves, chopped ham, and the like. Other cured meat products which may be processed in accordance with the present invention will be readily apparent to those skilled in the art.

In the foregoing description and in the claims to follow, the term "cured" is intended to mean the characteristic pink color commonly associated with cured meats.

Obviously many modifications and variations of the invention as hereinbefore set forth may be made without departing from the spirit and scope thereof, and therefore only such limitations should be imposed as are indicated in the appended claims.

I claim:

1. In a method of curing a meat product to accelerate the development of a cured color with a nitric oxide producing cured agent wherein the meat is contacted with a small amount of the order of less than about 0.02% of an edible water-soluble enediol containing compound, the improvement which comprises subjecting said meat product to vacuumizing whereby the development of the cured color in the vacuumized product is faster than in an unvacuumized product.

2. A method in accordance with claim 1 wherein the edible water-soluble enediol containing compound is selected from the group consisting of ascorbic acid, dihydroxy maleic acid, and edible salts thereof.

3. In a method of curing a domestic type sausage wherein a meat-water emulsion is prepared and stuffed in a casing and an edible water-soluble enediol containing compound in an amount of the order of less than about 0.02% is added to accelerate the development of the cured color with a nitric oxide producing curing agent, the step comprising vacuumizing the emulsion to at least about 26 inches mercury before stuffing, whereby the development of the cured color is obtained in a shorter time and with smaller amounts of the enediol compound than without vacuumizing.

4. A method of curing a domestic type sausage in accordance with claim 3 wherein the amount of the edible water-soluble enediol containing compound is less than 0.02% and is in excess of 0.0005% based on the weight of the meat.

5. A method of curing a domestic type sausage in accordance with claim 3 wherein the edible water-soluble enediol containing compound is a source of ascorbate ions.

References Cited in the file of this patent
UNITED STATES PATENTS

| | | |
|---|---|---|
| 2,002,146 | Jensen | May 21, 1935 |
| 2,117,478 | Hall | May 17, 1938 |
| 2,491,646 | Coleman et al. | Dec. 20, 1949 |
| 2,521,856 | Kraybill et al. | Sept. 12, 1950 |

OTHER REFERENCES

"Food, Technology," October 1949, pp. 332 to 336, inclusive, article entitled: Antioxidants in the hemoglobin catalyzed oxidation of unsaturated fats.